(12) United States Patent
Kimura et al.

(10) Patent No.: US 9,207,805 B2
(45) Date of Patent: Dec. 8, 2015

(54) COMPUTER-READABLE RECORDING MEDIUM, INFORMATION PROCESSING APPARATUS, AND CORRECTION PROCESSING METHOD

(71) Applicant: FUJITSU LIMITED, Kawasaki-shi, Kanagawa (JP)

(72) Inventors: Shinya Kimura, Sapporo (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/228,983

(22) Filed: Mar. 28, 2014

(65) Prior Publication Data

US 2014/0300573 A1    Oct. 9, 2014

(30) Foreign Application Priority Data

Apr. 8, 2013  (JP) ................................ 2013-080770

(51) Int. Cl.
*G06F 3/041* (2006.01)
*G06F 3/044* (2006.01)
*G06F 3/0488* (2013.01)

(52) U.S. Cl.
CPC .............. *G06F 3/0418* (2013.01); *G06F 3/044* (2013.01); *G06F 3/04883* (2013.01)

(58) Field of Classification Search
CPC ..... G06F 3/041; G06F 3/0412; G06F 3/0416; G06F 3/0418; G06F 3/044; G06F 3/0488; G06F 3/04883
See application file for complete search history.

(56) References Cited

U.S. PATENT DOCUMENTS

| 8,736,432 | B2 * | 5/2014 | Sitarski ....................... 345/174 |
| 2008/0047764 | A1 | 2/2008 | Lee et al. |
| 2009/0260898 | A1 * | 10/2009 | Jin et al. .................... 178/18.03 |
| 2010/0259493 | A1 | 10/2010 | Chang et al. |
| 2014/0237400 | A1 * | 8/2014 | Higgins et al. ............... 715/765 |

FOREIGN PATENT DOCUMENTS

| JP | 09-106326 | 4/1997 |
| JP | 2012-123678 | 6/2012 |
| JP | 2012-146184 | 8/2012 |

OTHER PUBLICATIONS

EESR—Extended European Search Report of European Patent Application No. 14162167.2 mailed Nov. 17, 2014.

* cited by examiner

*Primary Examiner* — Dwayne Bost
*Assistant Examiner* — Ivelisse Martinez Quiles
(74) *Attorney, Agent, or Firm* — Fujitsu Patent Center

(57) ABSTRACT

A computer-readable recording medium stores a correction processing program causes a computer including a touch panel and a temperature sensor to execute a process. The process includes determining whether a temperature measured by the temperature sensor is lower than a predetermined threshold when a first event completing contact with the touch panel is detected, waiting for a second event starting contact with the touch panel and a third event moving a contact position with the touch panel for a predetermined period of time when it is determined that the measured temperature is lower than the predetermined threshold, and discarding the first event and the second event and notifying an application of the third event, when the second event and the third event are detected during the predetermined waiting period of time.

8 Claims, 6 Drawing Sheets

| TEMPERATURE [°C] | TIMER VALUE [ms] |
|---|---|
| -10 | 300 |
| -11 | 310 |
| -12 | 320 |
| -13 | 330 |
| -14 | 340 |
| -15 | 350 |
| ⋮ | ⋮ |

COMPUTER-READABLE RECORDING MEDIUM, INFORMATION PROCESSING APPARATUS, AND CORRECTION PROCESSING METHOD

CROSS-REFERENCE TO RELATED APPLICATION

This application is based upon and claims the benefit of priority of the prior Japanese Patent Application No. 2013-080770, filed on Apr. 8, 2013, the entire contents of which are incorporated herein by reference.

FIELD

The embodiments discussed herein are related to a correction processing program, an information processing apparatus, and a correction processing method.

BACKGROUND

In recent years, information processing apparatuses on which a touch panel as an input device is mounted, such as smart phones, have been spread. The touch panel has both of a function as a display unit and a function as an operating unit. This enables a user to operate instinctively. Furthermore, the touch panel is mounted on the information processing apparatus, so that a physical operation key and the like can be removed from the information processing apparatus. This can reduce the apparatus in size. In addition, an operation by the touch panel and processing by an application are combined so as to achieve diverse operability. Conventional technologies are described in Japanese Laid-open Patent Publication No. 2012-146184 and Japanese Laid-open Patent Publications No. 2012-123678, for example.

Various advantages are obtained by mounting the touch panel on the information processing apparatus as described above. When a capacitive touch panel for detecting touch based on a change in electrostatic capacitance is employed, for example, there is a problem that sensitivity of touch detection lowers under a condition at a low temperature.

To be specific, when the temperature around the touch panel is −10° C., for example, the sensitivity of the touch panel lowers to approximately 60% in comparison with the case where the temperature is 20° C. When the sensitivity of the touch panel lowers in this manner, the touch panel does not detect contact although a user's finger or the like makes contact with the touch panel. For this reason, the touch panel does not receive an operation of the user rightly in some cases. In particular, when an operation (hereinafter, referred to as "move") that the user's finger or the like moves while making contact with the touch panel is not detected accurately, processing different from processing expected by the user is undesirably executed by an application. This lowers convenience.

SUMMARY

According to an aspect of an embodiment, a computer-readable recording medium stores therein a correction processing program causing a computer including a touch panel and a temperature sensor to execute a process. The process includes determining whether a temperature measured by the temperature sensor is lower than a predetermined threshold when a first event completing contact with the touch panel is detected, waiting for a second event starting contact with the touch panel and a third event moving a contact position with the touch panel for a predetermined period of time when it is determined that the measured temperature is lower than the predetermined threshold, and discarding the first event and the second event and notifying an application of the third event, when the second event and the third event are detected during the predetermined waiting period of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. It is to be noted that the invention is not limited to the embodiments. The following describes a mobile terminal apparatus such as a smart phone as an example of the information processing apparatus.

Figure 1:
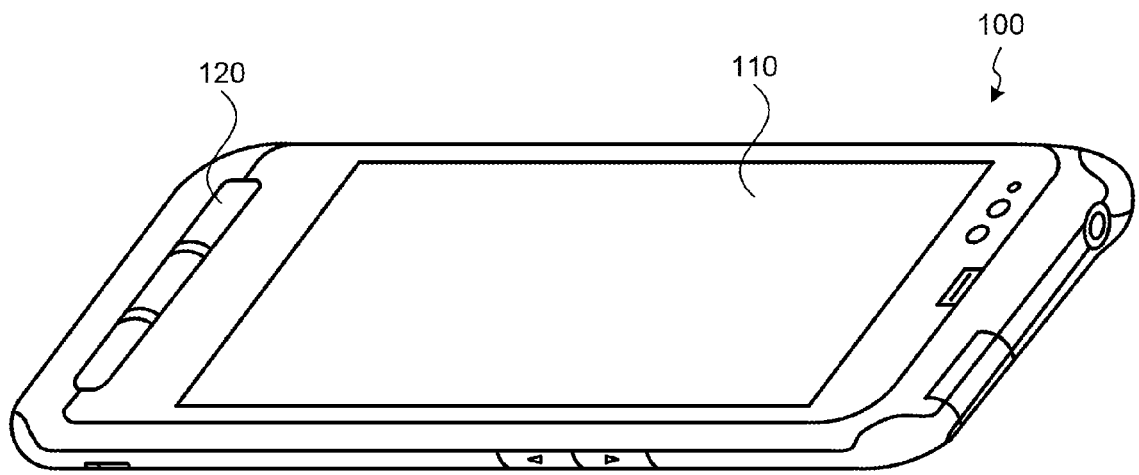
FIG. 1 is a view illustrating outer appearance of a mobile terminal apparatus according to an embodiment of the present invention.

FIG. 1 is a view illustrating outer appearance of a mobile terminal apparatus 100 according to an embodiment. The mobile terminal apparatus 100 as illustrated in FIG. 1 includes a touch panel 110 and operation keys 120. The touch panel 110 is provided on the surface of the mobile terminal apparatus 100. The touch panel 110 detects that a user's finger or the like makes contact therewith and receives operation input with the contact. That is to say, when the touch panel 110 is touched by the user's finger or the like as a conductor, the touch panel 110 detects a change in electrostatic capacitance by the touch so as to specify touched coordinates (hereinafter, referred to as "touch coordinates"). Furthermore, the touch panel 110 includes a liquid crystal module and the like and displays various pieces of information such as images and characters.

The operation keys 120 are physical keys capable of being pressed and receiving operation input if the user presses them. That is to say, the operation keys 120 include a physical key for switching ON and OFF of a power supply of the mobile terminal apparatus 100, for example. When the user presses the operation keys 120, the operation keys 120 cause the mobile terminal apparatus 100 to execute various functions.

Figure 2:
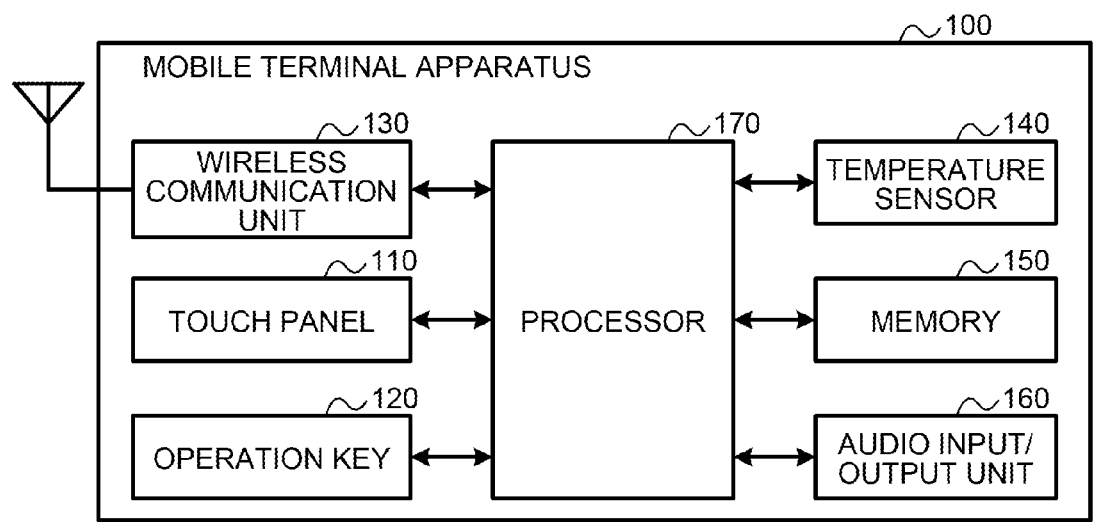
FIG. 2 is a block diagram illustrating the configuration of the mobile terminal apparatus in the embodiment.

FIG. 2 is a block diagram illustrating the configuration of the mobile terminal apparatus 100 in the embodiment. The mobile terminal apparatus 100 as illustrated in FIG. 2 includes the touch panel 110, the operation keys 120, a wireless communication unit 130, a temperature sensor 140, a memory 150, an audio input/output unit 160, and a processor 170.

As described above, the touch panel 110 detects the change in the electrostatic capacitance by touch and specifies touch coordinates. The touch panel 110 determines a touch type at the touch coordinates and outputs an event containing pieces of information including the touch coordinates and the touch type to the processor 170.

As the touch types, there are three types of down, up, and move. Among them, down corresponds to an operation that the user's finger or the like starts making contact with the touch panel 110 newly. Up corresponds to an operation that the user's finger or the like is separated from the touch panel 110 to complete the contact. As described above, move corresponds to an operation that the user's finger or the like moves while making contact with the touch panel 110. Accordingly, when the touch type is down, the touch panel 110 outputs a down event indicating the touch coordinates and occurrence of down to the processor 170. In the same manner, when the touch type is up or move, the touch panel 110 outputs an up event or a move event to the processor 170, respectively.

Furthermore, the touch panel 110 displays information such as images and characters in accordance with control by the processor 170. With this, when the user touches the touch panel 110, the user can operate instinctively as if the user touches the display screen directly.

The operation keys 120 receive operation input complementarily with the touch panel 110. To be specific, the operation keys 120 include the above-mentioned physical key for switching ON and OFF of the power supply and a physical key for switching light-up and light-off of the touch panel 110.

The wireless communication unit 130 receives a signal through an antenna and transmits a signal through the antenna. That is to say, the wireless communication unit 130 performs predetermined wireless reception processing (for example, down conversion and analog-to-digital (A/D) conversion) on the signal received through the antenna and outputs the received signal to the processor 170. Furthermore, the wireless communication unit 130 performs predetermined wireless transmission processing (for example, D/A conversion, up conversion) on the transmitted signal output from the processor 170 and transmits the transmitted signal through the antenna.

The temperature sensor 140 measures ambient temperature and notifies the processor 170 of the temperature as the measurement result. For example, the temperature sensor 140 may be provided at a position where it can measure a temperature of a heat generation part such as a battery. In the embodiment, the temperature sensor 140 can also measure an atmospheric temperature around the touch panel 110. Accordingly, the temperature sensor 140 measures the atmospheric temperature around the touch panel 110 that corresponds to the outside temperature, and outputs the temperature as the measurement result to the processor 170.

The memory 150 includes a read only memory (ROM) or a random access memory (RAM), for example. The memory 150 is a storage unit for storing therein applications executed by the processor 170, data, and the like.

The audio input/output unit 160 includes an audio input device such as a microphone and an audio output device such as a speaker. When the mobile terminal apparatus 100 is the smart phone capable of making a phone call, for example, the audio input/output unit 160 receives input of the speaking audio of the user and outputs the received audio.

The processor 170 acquires the event that is output from the touch panel 110 and executes processing of an application based on the touch coordinates and the touch type contained in the event. When the temperature that is output from the temperature sensor 140 is low, the processor 170 corrects the event that is reflected to execution of the processing of the application so as to compensate for lowering of the sensitivity of the touch panel 110 due to the low temperature. The correction of the event will be described in detail later.

Figures 3, 4:
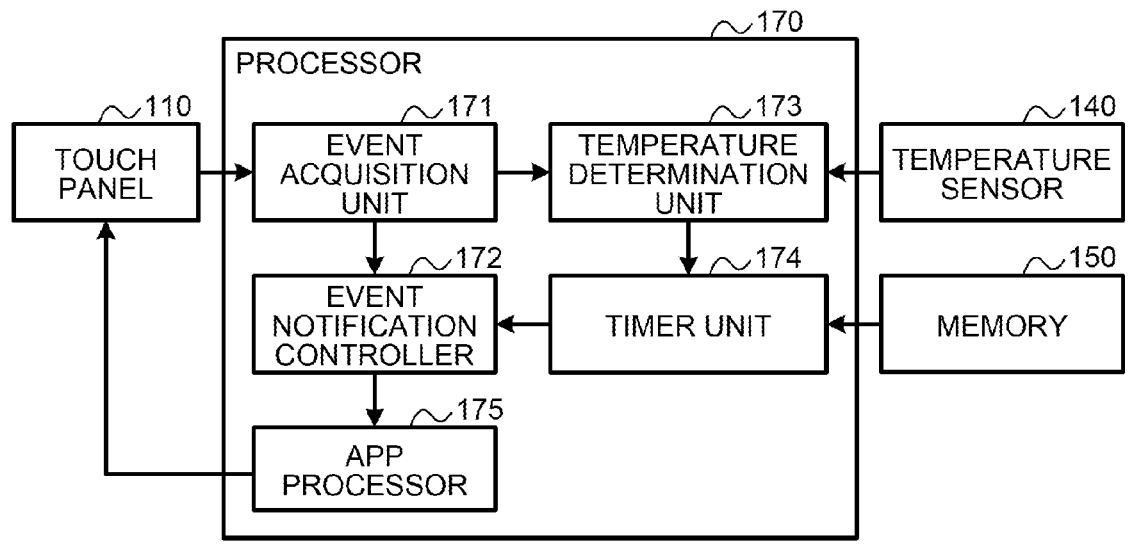
FIG. 3 is a block diagram illustrating functions of a processor in the embodiment.
FIG. 4 is a table illustrating a specific example of timer values in the embodiment.

FIG. 3 is a block diagram illustrating the functions of the processor 170 in the embodiment. The processor 170 as illustrated in FIG. 3 includes an event acquisition unit 171, an event notification controller 172, a temperature determination unit 173, a timer unit 174, and an application processor (hereinafter, abbreviated as "APP processor") 175.

The event acquisition unit 171 acquires the down event, the up event, and the move event from the touch panel 110. To be specific, when the user's finger or the like starts making contact with the touch panel 110, the event acquisition unit 171 acquires the down event. When the user's finger or the like moves while making contact with the touch panel 110, the event acquisition unit 171 acquires the move event. Thereafter, when the user's finger or the like is separated from the touch panel 110 so as to complete the contact, the event acquisition unit 171 acquires the up event. These events contain pieces of information including the touch coordinates and the touch type indicating down, up, or move. The sensitivity of the touch panel 110 lowers at the low temperature. Due to this, the event acquisition unit 171 may acquire the up event even when move continues, for example, in some cases.

The event notification controller 172 notifies the APP processor 175 of the event acquired by the event acquisition unit 171. That is to say, the event notification controller 172 notifies the APP processor 175 of the touch coordinates and the touch type. Note that when the up event and the down event are detected continuously within a predetermined period of time at the low temperature, the event notification controller 172 holds these events temporarily. When the move event is detected thereafter, the event notification controller 172 discards the events held.

To be specific, when the event acquisition unit 171 acquires the up event, the event notification controller 172 holds the up event temporarily. Then, as a result of temperature determination by the temperature determination unit 173, which will be described later, when the temperature is equal to or higher than a predetermined threshold, that is, the temperature is not low, the event notification controller 172 notifies the APP processor 175 of the up event held. On the other hand, when the temperature is lower than the predetermined threshold, that is, the temperature is low, the event notification controller 172 waits for a new down event and a new move event while holding the up event.

When the down event and the move event are detected before timer expiration on the timer unit 174, which will be described later, the event notification controller 172 discards the up event and the down event and notifies the APP processor 175 of the move event. Thus, when the down event and the move event are detected within the predetermined period of time before the timer expiration after the up event is detected, the up event and the down event are neglected and the APP processor 175 is notified of only the move event. Furthermore, when the timer on the timer unit 174 expires at a stage where the down event is detected, the event notification controller 172 notifies the APP processor 175 of the up event and the down event. Thus, when the move event is not detected within the predetermined period of time before the timer expiration after the up event is detected, the APP processor 175 is notified of the up event and the down event that have been detected actually.

When the event acquisition unit 171 acquires the up event, the temperature determination unit 173 acquires a temperature measured by the temperature sensor 140 and determines whether the acquired temperature is lower than the predetermined threshold. When the temperature is lower than the predetermined threshold, that is, the temperature around the touch panel 110 is low, the temperature determination unit 173 notifies the timer unit 174 of the acquired temperature. On the other hand, when the temperature is equal to or higher than the predetermined threshold, that is, the temperature around the touch panel 110 is not low, the temperature determination unit 173 notifies the event notification controller 172 of a fact indicating that the temperature is not low through the timer unit 174. As the predetermined threshold that is used for the determination by the temperature determination unit 173, it is sufficient that a low temperature at which the sensitivity of the touch panel 110 lowers to a non-negligible extent is used. For example, −10° C. can be used as the predetermined threshold.

When the temperature determination unit 173 notifies the timer unit 174 of the temperature, the timer unit 174 reads out a timer value corresponding to the notified temperature from the memory 150 and sets the read timer value so as to start counting. When the timer unit 174 completes the counting of the set timer value and the timer expires, the timer unit 174 notifies the event notification controller 172 of the timer expiration. Thus, when the up event is detected at the low temperature, the timer unit 174 counts the timer value as a waiting time for waiting for the down event and the move event after the up event is detected.

The memory 150 stores therein the timer value that is counted by the timer unit 174 previously. That is to say, the memory 150 stores therein the timer value for each temperature as illustrated in FIG. 4, for example, and the timer unit 174 reads out the timer value corresponding to the temperature from the memory 150. The timer value as illustrated in FIG. 4 becomes larger as the temperature is lower. This indicates that as the temperature is lower, the waiting time for waiting for the down event and the move event after the up event is detected becomes longer. The timer value not necessarily has to be different depending on the temperatures. The same timer value may be used for the temperatures that are lower than a predetermined threshold.

The APP processor 175 executes processing of an application and causes the touch panel 110 to display information such as images and characters as a processing result. When the APP processor 175 executes the processing of the application, the APP processor 175 uses the event notified from the event notification controller 172. That is to say, the APP processor 175 knows an operation of the user from the touch coordinates and the touch type contained in the event so as to execute the processing in accordance with the operation of the user. Accordingly, when the user's finger or the like makes contact with an object that is displayed on the touch panel 110 and can be selected, for example, the APP processor 175 receives notification of the down event and executes processing of selecting the object displayed at the touch coordinates, and the like.

When the timer unit 174 starts counting the timer value, the APP processor 175 makes warning display inducing lowering of a movement speed of move on the touch panel 110. In the embodiment, when the up event is detected at the low temperature, the timer unit 174 starts counting the timer value. However, since the sensitivity of the touch panel 110 lowers at the low temperature, reliability of the detected up event is low. In other words, at the low temperature, even when the user's finger or the like continues move, the touch panel 110 detects up and the up event is detected mistakenly in some cases. For coping with this, when the up event is detected at the low temperature, the APP processor 175 makes warning display so as to induce the user to lower the movement speed of move. This enables even the touch panel 110 of which sensitivity has lowered to detect move accurately.

A specific method of the warning display includes a method of changing a color of a following circle that is displayed on the touch panel 110 while following move of the user's finger or the like or flashing the following circle, for example. The APP processor 175 makes the warning display when the up event is detected at the low temperature. Based on this, the warning display is made temporarily also when the user's finger or the like is separated from the touch panel 110 actually and up occurs.

Figure 5:
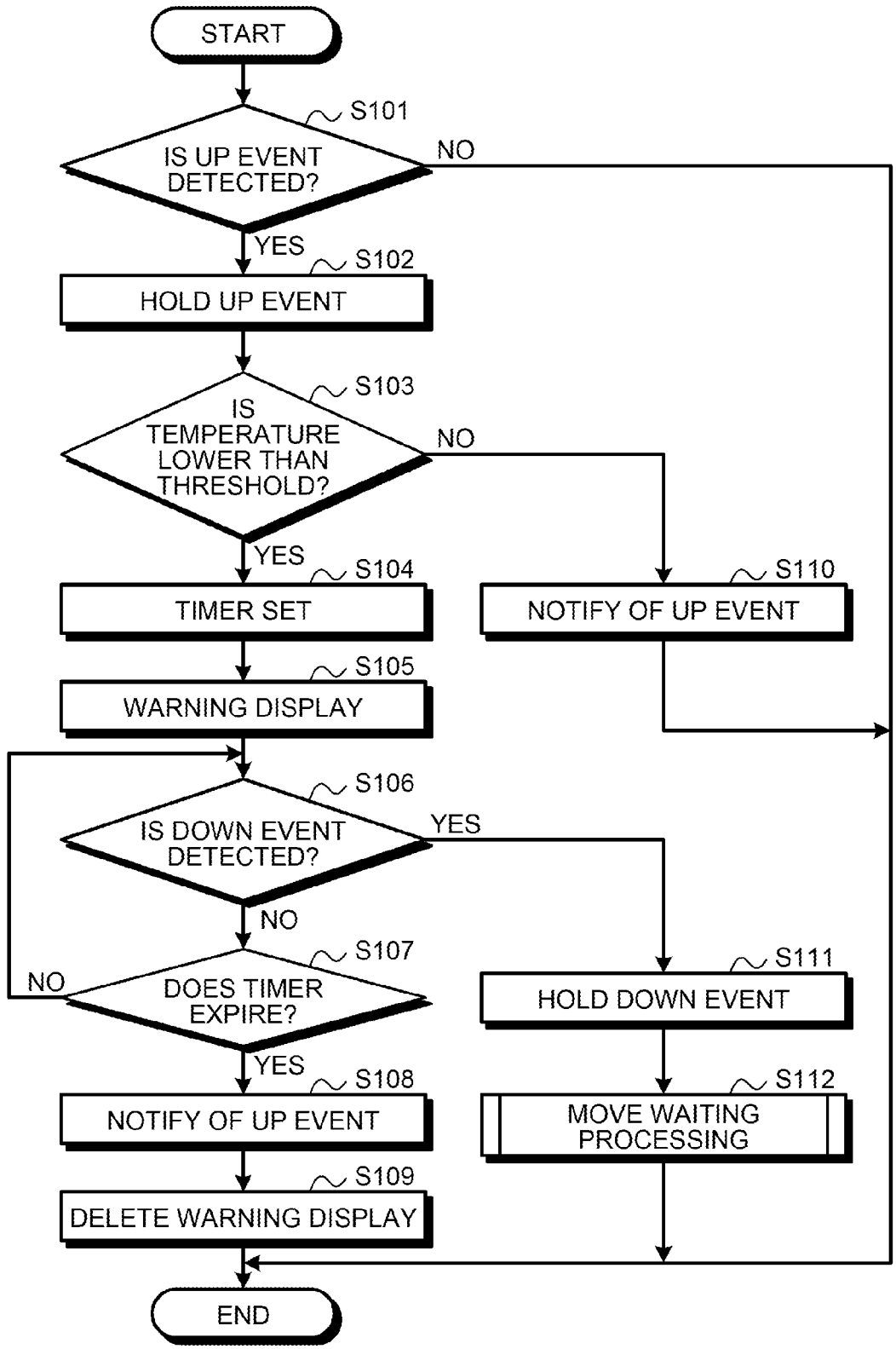
FIG. 5 is a flowchart illustrating operations of the mobile terminal apparatus in the embodiment.

Next, described are operations of the mobile terminal apparatus 100 configured as described above with reference to a flowchart as illustrated in FIG. 5. The following describes operations after the up event is detected mainly. Note that the up event indicates that the user's finger or the like is separated from the touch panel 110 and the contact is completed.

In the state where the user's finger or the like makes contact with the touch panel 110, the touch panel 110 outputs the down event or the move event and the event acquisition unit 171 of the processor 170 acquires the event. During this, the event notification controller 172 monitors whether the up event is detected (step S101). Then, while the down event or the move event other than the up event is detected (No at step S101), the APP processor 175 is notified of the down event or the move event continually. The APP processor 175 executes processing of the application in accordance with the touch coordinates and the touch type.

On the other hand, if the event notification controller 172 detects the up event (Yes at step S101), the APP processor 175 is not notified of the up event and correction processing of the event notification is started. That is to say, first, the event notification controller 172 holds the detected up event temporarily (step S102). The temperature determination unit 173 acquires the temperature from the temperature sensor 140 and determines whether the acquired temperature is lower than the predetermined threshold (step S103).

As a result of the determination, if the temperature is equal to or higher than the predetermined threshold (No at step S103), the temperature determination unit 173 notifies the event notification controller 172 of the fact indicating that the temperature is not low through the timer unit 174, and notifies the APP processor 175 of the up event held temporarily (step S110). A reason of this is as follows. That is, when the temperature is not low, the sensitivity of the touch panel 110 does not lower and the up event can be detected with up occurring actually. Accordingly, correction of the event notification is not needed. The APP processor 175 executes processing of the application in accordance with the up event when it is notified of the up event.

As a result of the determination at step S103, if the temperature is lower than the predetermined threshold (Yes at step S103), the temperature determination unit 173 notifies the timer unit 174 of the temperature. Then, the timer unit 174 reads out the timer value corresponding to the temperature from the memory 150, the timer unit 174 starts counting the read timer value (step S104).

At the same time, the APP processor 175 makes the warning display on the touch panel 110 (step S105), because the sensitivity of the touch panel 110 may lower at the low temperature and the up event may be detected mistakenly although move continues actually. That is to say, the event notification controller 172 notifies the APP processor 175 of the start of the counting by the timer unit 174, and the APP processor 175 makes display for inducing lowering of the movement speed of the user's finger or the like moving on the touch panel 110. To be specific, for example, the APP processor 175 makes the warning display of changing the color of the following circle that follows the movement of the user's finger or the like. With this, the lowering of the movement speed of the user's finger or the like can be expected when the user continues move. This enables the touch panel 110 of which sensitivity has lowered to detect move accurately. Also when the user does not continue move and up is generated actually, the APP processor 175 makes warning display temporarily but deletes the warning display after the timer expiration, as will be described later.

After the event notification controller 172 detects the up event, the event notification controller 172 monitors whether the down event is detected in the same manner as the detection of the up event (step S106). Then, while the down event is not detected (No at step S106), the event notification controller 172 determines whether it is notified of the timer expiration from the timer unit 174 (step S107). The event notification controller 172 monitors whether the down event is detected subsequently until it is notified of the timer expiration (No at step S107).

Then, if the counting of the timer value set to the timer unit 174 is completed while the down event is not detected (Yes at step S107), the event notification controller 172 notifies the APP processor 175 of the up event held (step S108). At the same time, the APP processor 175 deletes the warning display on the touch panel 110 on reception of a direction from the event notification controller 172 (step S109). Even when the up event is detected at the low temperature, if the down event is not detected before the timer expiration, up can occur actually. Accordingly, correction of the event notification is not needed. With this, the event notification controller 172 notifies the APP processor 175 of the up event held thereby and deletes the warning display of the following circle of which color has changed, for example.

On the other hand, if the down event is detected before the timer expiration (Yes at step S106), the event notification controller 172 holds the detected down event temporarily (step S111). With this, the event notification controller 172 holds the up event and the down event that have occurred continuously within the time of the timer value. Then, after the down event is detected, the event notification controller 172 mainly executes waiting processing for the move event (step S112).

That is to say, there is a possibility that move is detected to be discontinuous due to the lowering of the sensitivity of the touch panel 110 and the up event and the down event are detected continuously within a short period of time although move continues on the touch panel 110 actually. For coping with this, the event notification controller 172 waits for the move event continuous to the up event and the down event that have been detected continuously within the short period of time. As a result, when the move event is detected subsequently to the up event and the down event within the predetermined period of time, it can be determined that the up event and the down event have been detected mistakenly due to the lowering of the sensitivity of the touch panel 110.

Figure 6:
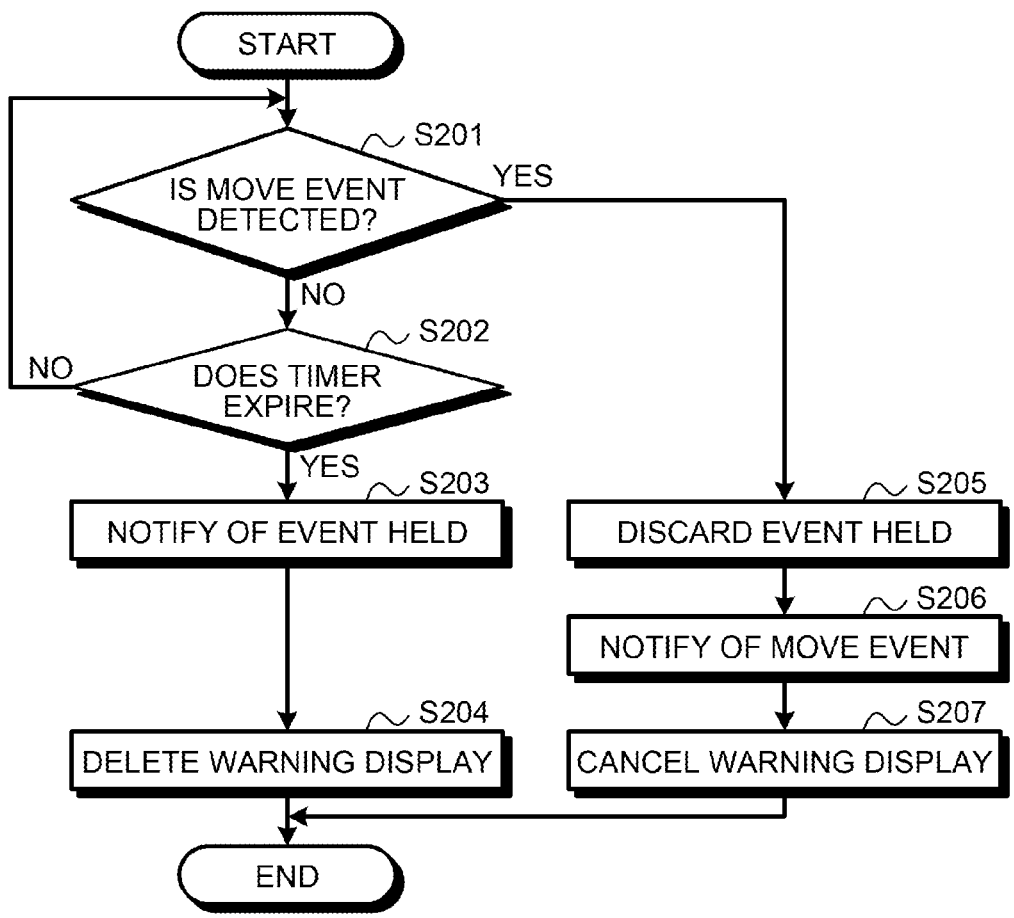
FIG. 6 is a flowchart illustrating move waiting processing in the embodiment.

FIG. 6 is a flowchart illustrating move waiting processing in the embodiment.

After the event notification controller 172 detects the down event, the event notification controller 172 monitors whether the move event is detected in the same manner as the detection of the down event (step S201). Then, while the move event is not detected (No at step S201), the event notification controller 172 determines whether it is notified of the timer expiration from the timer unit 174 (step S202). The event notification controller 172 monitors whether the move event is detected subsequently until it is notified of the timer expiration (No at step S202).

If the counting of the timer value set to the timer unit 174 is completed while the move event is not detected (Yes at step S202), the event notification controller 172 notifies the APP processor 175 of the events held (step S203). In this case, the event notification controller 172 holds the up event and the down event, so that it notifies the APP processor 175 of the up event and the down event. At the same time, the APP processor 175 deletes the warning display on the touch panel 110 on reception of a direction from the event notification controller 172 (step S204). Even when the up event and the down event are detected continuously for the short period of time at the low temperature, if the move event is not detected before the timer expiration, up and down can occur actually. Accordingly, correction of the event notification is not needed. With this, the event notification controller 172 notifies the APP processor 175 of the up event and the down event held thereby. As a result, the APP processor 175 knows that the user's finger or the like is separated from the touch panel 110 once, and then, makes contact with it again. Then, the APP processor 175 executes processing in accordance with the operation. Furthermore, because it is determined that move does not continue, the APP processor 175 deletes the warning display of the following circle of which color has changed, for example.

On the other hand, if the move event is detected before the timer expiration (Yes at step S201), the event notification controller 172 performs event notification correction of discarding the events held (step S205). In this case, as the event notification controller 172 holds the up event and the down event, the event notification controller 172 performs correction of discarding the up event and the down event. With this, the up event and the down event that have occurred continuously within the time of the timer value are discarded, and the APP processor 175 is not notified of the occurrence of up and down. Then, the event notification controller 172 notifies the APP processor 175 of the move event detected subsequently to the up event and the down event discarded (step S206).

As a result, the APP processor 175 is notified of the move event subsequent to the event (down event or move event) that has been detected immediately before the up event detected at step S101 in FIG. 5. In other words, the event notification correction of neglecting the up event and the down event that have been detected at step S101 and step S106, respectively, in FIG. 5 is performed. The APP processor 175 knows that the user's finger or the like keeps making contact with the touch panel 110. Accordingly, the APP processor 175 executes the processing when move continues without being discontinuous.

Furthermore, the APP processor 175 knows that move continues rightly, so that the APP processor 175 cancels the warning display on the touch panel 110 on reception of a direction from the event notification controller 172 (step S207). That is to say, the warning display is cancelled by returning the color of the following circle that has changed during the warning display to a normal color, for example.

Thus, when the up event, the down event, and the move event are detected continuously for a short period of time at the low temperature, correction of discarding the up event and the down event is performed. Then, the event notification controller 172 notifies the APP processor 175 of the move event only, and the APP processor 175 knows that the user's finger or the like keeps making contact with the touch panel 110 without being separated therefrom. This enables the APP processor 175 to execute processing when move continues.

Figure 7:
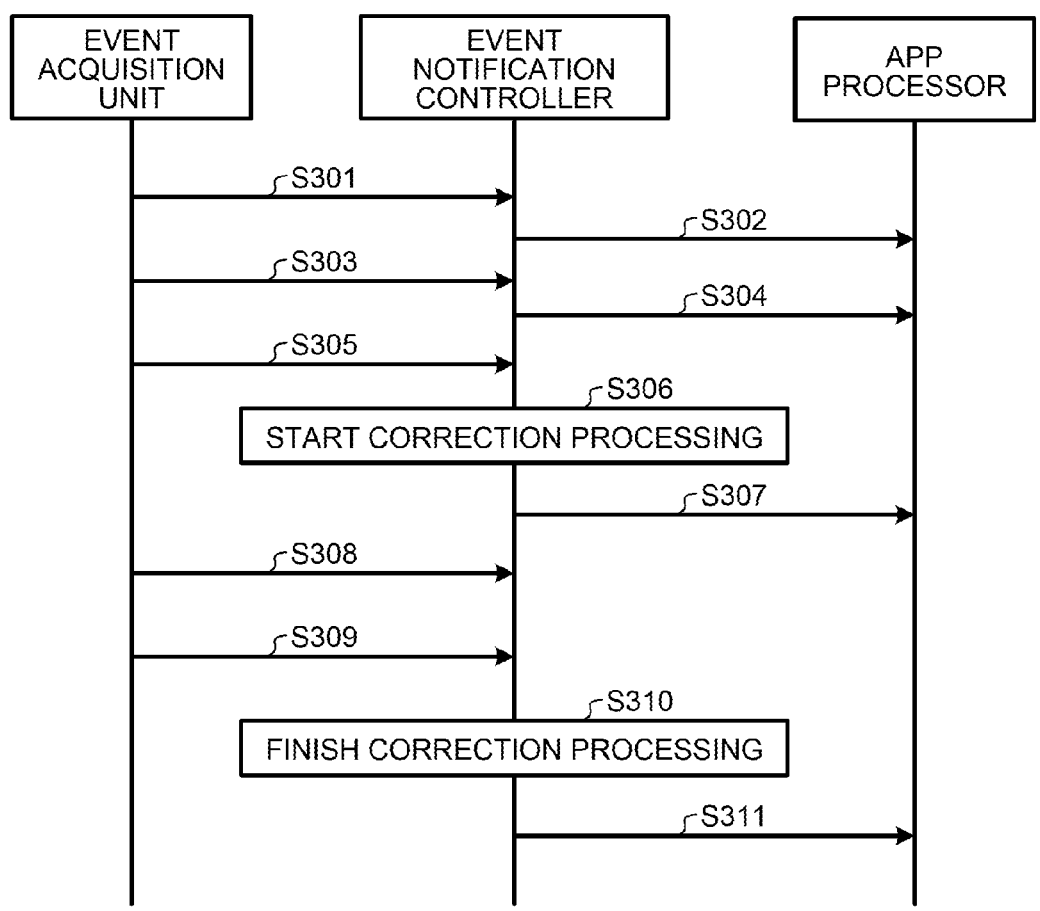
FIG. 7 is a sequence diagram illustrating a specific example of operations of the processor in the embodiment.

Next, described is a specific example of operations of the processor 170 in the embodiment with reference to a sequence diagram as illustrated in FIG. 7. Described is an example when the APP processor 175 executes an unlock application. The unlock application is an application for unlocking the mobile terminal apparatus 100 when a user follows a plurality of points displayed on the touch panel 110 along a trajectory registered previously.

When the unlock application is activated, a plurality of points (for example, nine points) are displayed on the touch panel 110. When the user touches a point as a starting point of the trajectory registered previously among these points, the touch panel 110 detects down. Accordingly, the event acquisition unit 171 of the processor 170 acquires a down event and the acquired down event is output to the event notification controller 172 (step S301).

Figure 8:
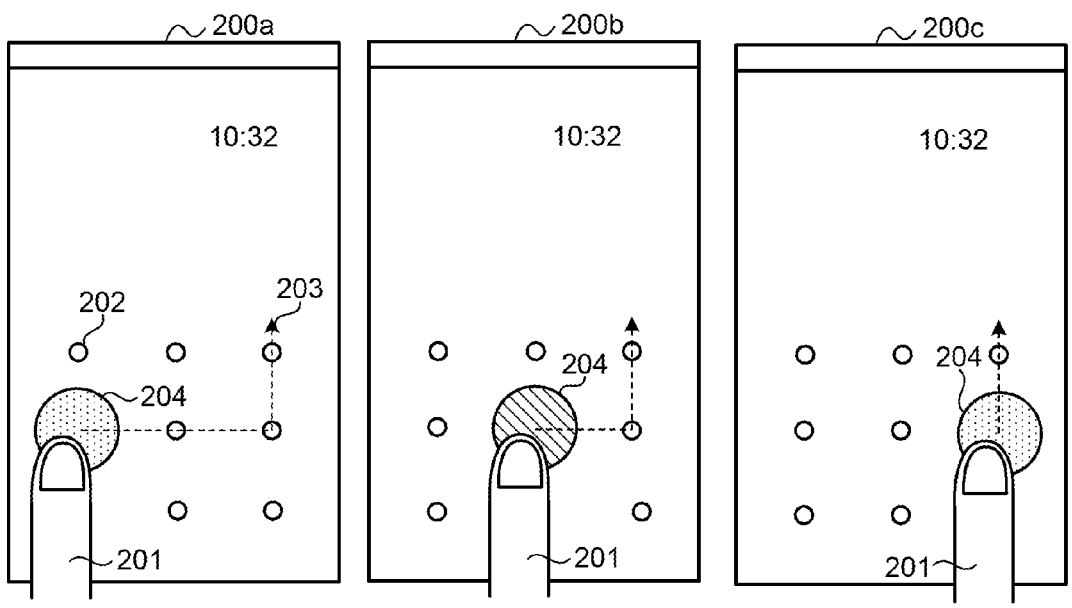
FIG. 8 is a view illustrating a specific example of display in the embodiment.

The event notification controller 172 notifies the APP processor 175 of the down event (step S302), the APP processor 175 displays processing of displaying a following circle at touch coordinates on the touch panel 110. To be specific, as illustrated in a display screen example 200a in FIG. 8, when a finger 201 of the user makes contact with a point as a starting point of a trajectory 203 registered previously among a plurality of points 202, a following circle 204 is displayed around the touch coordinates.

When the finger 201 of the user moves along the trajectory 203, the touch panel 110 detects move. Accordingly, the event acquisition unit 171 of the processor 170 acquires a move event, and the acquired move event is output to the event notification controller 172 (step S303).

The event notification controller 172 notifies the APP processor 175 of the move event (step S304). Then, the APP processor 175 executes processing of moving the following circle on the touch panel 110 in accordance with variation of the touch coordinates. In FIG. 7, the event notification controller 172 notifies the APP processor 175 of the move event by one time. Alternatively, the event notification controller 172 may notify the APP processor 175 of the move events by a plurality of times with the movement of the finger 201 of the user.

When move of the finger 201 of the user continues in this manner, there is a case where the sensitivity of the touch panel 110 lowers because of the low temperature. Due to this, the touch panel 110 does not detect contact of the finger 201 of the user therewith in some cases. As a result, although move continues, the touch panel 110 detects up. Accordingly, the event acquisition unit 171 of the processor 170 acquires the up event and the acquired up event is output to the event notification controller 172 (step S305).

When the event notification controller 172 detects the up event, there is a possibility that the up event is detected mistakenly due to the lowering of the sensitivity of the touch panel 110. For this reason, the event notification controller 172 starts correction processing (step S306). To be specific, the event notification controller 172 holds the up event so that the APP processor 175 is not notified of the up event. Then, the temperature determination unit 173 determines whether the temperature acquired from the temperature sensor 140 is lower than the predetermined threshold. Note that description is continued while assuming that the temperature is low at which the sensitivity of the touch panel 110 lowers and the temperature is lower than the predetermined threshold.

When the temperature determination unit 173 determines that the temperature is lower than the predetermined threshold, the timer unit 174 reads out the timer value corresponding to the temperature from the memory 150 and starts counting the timer value. Furthermore, when the counting of the timer value is started, the event notification controller 172 notifies the APP processor 175 of the start of the counting of the timer value (step S307). With this, the APP processor 175 executes warning display on the touch panel 110. That is to say, as illustrated in a display screen example 200b in FIG. 8, the color of the following circle 204 that follows the movement of the finger 201 of the user and is displayed on the touch panel 110 is changed. This induces lowering of the movement speed of the finger 201.

Thus, when the up event is detected due to the lowering of the sensitivity of the touch panel 110 caused by the low temperature although the user continues move, warning display is made for the user. As a result, the user lowers the movement speed of the finger 201 and even the touch panel 110 of which sensitivity has lowered can detect touch by the finger 201 again.

When the touch panel 110 starts detecting touch by the finger 201, again, the touch panel 110 detects occurrence of down. Accordingly, the event acquisition unit 171 of the processor 170 acquires the down event and the acquired down event is output to the event notification controller 172 (step S308). Note that the event notification controller 172 waits for the down event and the move event while holding the up event before timer expiration of the timer unit 174. With this, the event notification controller 172 holds the down event output from the event acquisition unit 171 together with the up event that is already held.

When the finger 201 of the user moves, the touch panel 110 detects move subsequent to down. Accordingly, the event acquisition unit 171 of the processor 170 acquires the move event and the acquired move event is output to the event notification controller 172 (step S309). In this manner, the event notification controller 172 detects the down event and the move event before the timer of the timer unit 174 expires after the up event is detected. It can be determined that the event notification controller 172 is notified of the up event and the down event mistakenly due to the lowering of the sensitivity of the touch panel 110 caused by the low temperature although move continues actually. For coping with this, the event notification controller 172 executes correction of discarding the up event and the down event held and completes the correction processing of the event notification (step S310).

Thereafter, the event notification controller 172 notifies the APP processor 175 of the move event (step S311). The APP processor 175 knows that move continues from the move event notified at step S304. As a result, in the processing of the unlock application, the movement trajectory of the finger 201 that is identical to move of the user is obtained. This enables to compare the movement trajectory intended by the user with the trajectory 203 registered previously. Furthermore, when the APP processor 175 is notified of the move event, the event notification controller 172 issues a direction to cancel the warning display to the APP processor 175 at the same time. With this, the APP processor 175 cancels the warning display. To be specific, as illustrated in a display screen example 200c in FIG. 8, the color of the following circle 204 following the finger 201 is returned to a normal color.

As described above, in the embodiment, when the up event is detected at the low temperature, an application waits for the down event and the move event for a predetermined period of time without being notified of the up event. When the down event and the move event are detected within the predetermined period of time, correction of discarding the up event and the down event is performed. With this, the application knows that move continues rightly without being notified of up and down that have been detected by the touch panel mistakenly due to the lowering of the sensitivity caused by the low temperature. As a result, an operation intended by the user can be reflected even at the low temperature, thereby suppressing lowering of convenience.

The operations of the mobile terminal apparatus 100 as described in the above-mentioned embodiment can be described as programs that can be executed by a computer. In this case, the programs can be stored in a recording medium that can be read by the computer and be introduced to the computer. As the recording medium that can be read by the computer, for example, portable recording media such as a compact disc read only memory (CD-ROM), a digital versatile disc (DVD), and a universal serial bus (USB) memory, and semiconductor memories such as a flash memory can be exemplified.

According to one aspect of the correction processing program, the information processing apparatus, and the correction processing method that are disclosed by the present application, the following effect can be obtained. That is, an operation intended by the user can be reflected even at the low temperature, thereby suppressing lowering of convenience.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein a correction processing program causing a computer including a touch panel and a temperature sensor to execute a process comprising:
   determining whether a temperature measured by the temperature sensor is lower than a predetermined threshold when a first event completing contact with the touch panel is detected;
   waiting for a second event starting contact with the touch panel and a third event moving a contact position with the touch panel for a predetermined waiting period of time when it is determined that the measured temperature is lower than the predetermined threshold; and
   discarding the first event and the second event and notifying an application of the third event, when the second event and the third event are detected during the predetermined waiting period of time.

2. The non-transitory computer-readable recording medium according to claim 1, wherein the notifying includes notifying the application of the first event when both the second event and the third event are not detected during the predetermined waiting period of time.

3. The non-transitory computer-readable recording medium according to claim 1, wherein the notifying includes notifying the application of the first event and the second event when only the second event out of the second event and the third event is detected during the predetermined waiting period of time.

4. The non-transitory computer-readable recording medium according to claim 1, wherein the process further comprises
   notifying the application of the first event when it is determined that the temperature measured by the temperature sensor is equal to or higher than the predetermined threshold.

5. The non-transitory computer-readable recording medium according to claim 1, wherein the waiting includes waiting for the second event and the third event for a predetermined period of time according to the temperature measured by the temperature sensor.

6. The non-transitory computer-readable recording medium according to claim 5, wherein the waiting includes waiting for the second event and the third event for a longer period of time as the temperature measured by the temperature sensor is lower.

7. An information processing apparatus comprising:
   a touch panel that detects an event relating to presence and absence of contact;
   a temperature sensor that measures an atmospheric temperature; and
   a processor that is connected to the touch panel and the temperature sensor, wherein the processor executes a process comprising:
   determining whether the temperature measured by the temperature sensor is lower than a predetermined threshold when a first event completing contact with the touch panel is detected;
   waiting for a second event starting contact with the touch panel and a third event moving a contact position with the touch panel for a predetermined waiting period of time when it is determined that the measured temperature is lower than the predetermined threshold; and
   discarding the first event and the second event and notifying an application of the third event, when the second event and the third event are detected during the predetermined waiting period of time.

8. A correction processing method executed by an information processing apparatus including a touch panel and a temperature sensor, the correction processing method comprising:
   determining, using a processor, whether a temperature measured by the temperature sensor is lower than a predetermined threshold when a first event completing contact with the touch panel is detected;
   waiting for a second event starting contact with the touch panel and a third event moving a contact position with the touch panel for a predetermined waiting period of time when it is determined that the measured temperature is lower than the predetermined threshold; and
   discarding, using the processor, the first event and the second event and notifying an application of the third event, when the second event and the third event are detected during the predetermined waiting period of time.

* * * * *